United States Patent [19]

Dungan

[11] Patent Number: 5,385,657
[45] Date of Patent: Jan. 31, 1995

[54] APPARATUS FOR THE GASIFICATION OF WATER

[76] Inventor: Arthur E. Dungan, P.O. Box 8, Bethany, La. 71007

[21] Appl. No.: 124,448

[22] Filed: Sep. 22, 1993

[51] Int. Cl.$^6$ .......................... C25B 9/00; C25B 15/08
[52] U.S. Cl. ..................................... 204/228; 204/278
[58] Field of Search ............................. 204/275–278, 204/229, 228

[56] References Cited

U.S. PATENT DOCUMENTS

| | | | |
|---|---|---|---|
| 3,311,097 | 3/1967 | Mittelstaedt | 204/278 X |
| 4,361,474 | 11/1982 | Shoaf et al. | 204/278 X |
| 5,196,104 | 3/1993 | Munday | 204/278 X |
| 5,211,828 | 5/1993 | Shkarvand-Moghaddam | 204/278 X |
| 5,231,954 | 8/1993 | Stowe | 204/278 X |
| 5,244,558 | 9/1993 | Chiang | 204/278 X |

Primary Examiner—Donald R. Valentine
Attorney, Agent, or Firm—John M. Harrison

[57] ABSTRACT

An apparatus and method for generating hydrogen gas by reacting water and an electrode at high temperature, wherein water is delivered under pressure by a pump in communication with a storage facility or tank in a manner forcing the water, at a controlled rate, into a gas tight vessel in which a heated electrode is positioned. An exothermic reaction takes place, whereby the liquid reactant, water, is reduced to hydrogen gas.

A conduit in communication with the produced gas outlet of the vessel conducts the hydrogen gas to the predetermined connection for use, whether for combustion in an engine, or for industrial use.

10 Claims, 2 Drawing Sheets

APPARATUS FOR THE GASIFICATION OF WATER

FIELD OF THE INVENTION

A chronology depicting the evolution of the gasification of fuels would cover a period of time dating back to the late nineteenth century, when gases were produced from pulverized coal. This method of producing fuel became obsolete upon the introduction of the automobile, which made manifest the necessity of supplying gasoline in large quantities.

This demand was steadily increasing since that time, reaching the point at which most of our gasoline is imported from foreign countries and has become a process of transporting said gasoline thousands of miles, refining and distributing for use; this involves the continuous handling of a combustible which is probably the most unstable and unsafe of all known volatile fuels.

Therefore, it is the intent, by the revelation of the herein disclosed invention, to eliminate some, if not all, of the abovementioned hazards inherent in the use of hydrocarbons as fuel; the danger is ever present, as these fuels can explode upon impact and cause serious injury, in addition to being one of the sources of massive polution of the environment. Said invention, being a compact, individual generator for an automobile, can assuage the demand for imported, flammable fuel and compose a safety factor on the highways, while conserving the supply of petroleum and producing no polution.

DESCRIPTION OF THE PRIOR ART

The internal combustion engine has become sufficiently commonplace in somewhat over one hundred years, to the extent that its dependability and generally efficient performance are not taken for granted. However, there is opportunity for improvement: those engines on the market and in use today are totally dependent upon a constant supply of fuel, the supply of which consists of one or another variety of hydrocarbon products.

For a brief period of time the early models of engines were operated using coal oil, methane and other fuels extracted from lignite. Coal gas was made by distilling pulvarized coal and consisted mostly of methane, hydrogen sulphide and carbon dioxide. Producer gas was made from distilled coke and treated with steam. Water gas was also made from charcoal, coal or coke and treated with steam and oxygen. Hydrogen, the fuel concerned with this invention, was made for industry from methane by the cracking process, in which methane was reduced to hydrogen;

$$CH_4 \xrightarrow[H]{catalyst} C + H_2.$$

With the increase production of petroleum, gasoline became the principle fuel for engines, and remains as such today, regardless of being blamed as the cause of thousands of fire automobile crashes and subsequent lawsuits. Also, as the production increases, the price of gasoline rises higher. For instance, a person who commutes one hundred miles per day, would probably feel more at ease upon being able to fill his or her automobile fuel tank from the garden hose, driving through the rush hour with the knowledge that the propellant for the automobile was being generated under the hood of the vehicle, at neither cost nor danger to himself or herself, nor others.

Hydrogen has been used on many projects as fuel in research engines and proved superior to gasoline and diesel fuel, especially for quick starting in cold weather; as being in gas form, there is no delay for vaporization. Engine wear was much less, and performance was significantly greater. An outstanding advantage was shown by the fact that the combustion of hydrocarbon produced no pollution, inasmuch as an innocuous water vapor was the only hi-product. The water vapor will prevent the formation of cyanogen ($C_2N_2$), which, together with hydrogen sulphide ($H_2S$) is frequently produced by catalytic converters from an over-rich fuel mixture, and/or the presence of unburned hydrocarbons, subjected to the intense heat of the catalytic converter. Both of these gases are among the most deadly of those known to man.

The reasons customarily stated regarding the fact that hydrogen has not been generally adopted as a fuel, is the problem of transportation and availability; this gas, in captivity, is considered to be more or less unstable; moreover, it is not easily obtainable in less populated areas. Also, reference is sometimes made to the fiery blast of the dirigible Hindenburg in 1937. Hydrogen should be a simple solution to the problem of pollution from the combustion of various fuels.

Coal, for instance, has a history of creating poisonous smoke, and even causing many deaths from the inhalation of colloidal particulates produced by the combustion of coal; as long ago as the thirteenth century in England, the use of some types of coal was banned.

In the late 19th century in the United States, some of the hundreds of the hugh coke ovens such as the Coxe, Semet, Solvey, and Koppers, made coke and various biproducts such as gas, ammonia and methane, with little knowledge or concern for the protection of the environment, until the invention of the Cotrell Precipitator. This process consists of electrically charging carbon and dust particles, then activating highly charged electrodes which attract the particles, neutralizing and depositing these particles as dust.

Gasoline and other hydrocarbons such as diesel fuel, methane, kerosene, coke and coal are probably the largest producers of pollution at present. One poisonous gas produced by these fuels, carbon monoxide, (CO) have been neutralized, to some extent, over the years by the mandatory installation of the catalytic converter, together with many environmental attachments. The converter, while changing carbon monoxide into harmless oxygen, also creates, under certain conditions, two more gases, equally as deadly; hydrogen sulphide ($H_2S$), which has the faculty of paralyzing the olfactory nervous system, the only warning means of detecting its presence; and cyanogen ($C_2N_2$), which, if in contact with moisture, converts to hydrogen cyanide ($C_2N_2 + H_2O = HCN + HOCN$). An over-rich fuel mixture produces unburned hydrogen particulates; and upon contact with the intense heat of the catalytic converter, produces these gases.

The following U.S. patents are pertinent to the subject of this application: U.S. Pat. No. 4,737,161, issued Jan. 28, 1987, to D. F. Szydlowski; U.S. Pat. No. 4,950,460, issued Oct. 3, 1988, to John C. Goodwin; U.S. Pat. No. 4,702,894, dated Oct. 23, 1985, to Francis Cornish.

Publications pertinent to the subject of the application are as follows: General Chemistry, 1976 edition pp. 168-179, 568-595 and 858-859.

American Fuels, 1922 edition, pp. 44-81, 185-191 and 329-393.

Automotive Mechanics, 1975 edition, pp. 141-188.

SUMMARY OF THE INVENTION

In an effort to relieve this situation, the present invention as disclosed herein presents an apparatus enabling the engine to be more self-sufficient, by having the wherewithal for producing the fuel for its own use, from ordinary water. By the engine being equipped with this device, instead of the currently used propellant which cost over $1.00 per gallon, fuel can be available free of charge. In addition, this fuel is pollution free, and the danger of fire is eliminated as the newly generated fuel is consumed instantly upon being produced.

The apparatus herein presented thus generates an efficient gas, to be used as a fuel; this is accomplished with only a minimal amount of pressure within the system of the device. The pump supplying the liquid reactant creates a pressure perhaps two pounds; this pressure dissipates upon the egress of the water through the negative electrode holder. The reaction, when taken place in the reactor vessel, disposes less than one pound of pressure. The generated gas is drawn into the combustion chamber by the vacuum-creating action of each piston, in turn, upon the intake stroke of each cylinder.

An apparatus and method for producing an efficient propellant by means of effecting a chemical reaction wherein water is reacted with an electrode composed of certain elements, and energized by an electrical current, bringing the electrode to the proper temperature, at which the reaction takes place, producing hydrogen gas to be used as fuel.

The electrode is secured in place by being operationally connected, at each end, to an electrode holder and having a gas tight reaction vessel between, and in juxtaposition with, the tips of the holders, with the electrode centered longitudinally inside the vessel. One of the holders is equipped to accommodate a metering nozzle, for the purpose of measuring the infusion of water into the vessel and positioned upon the negative terminal of the circuit, while the other holder is disposed for the egress of produced gas by being placed in communication with a conduit which is operationally connected to the fuel inlet of the engine, with the electrode holder positioned upon the positive terminal of the electrical circuit.

The electrode, which is the first reactant, when at the proper temperature reacts to the increasing water, the liquid reactant, and instantly reduces the water to hydrogen, per equation:

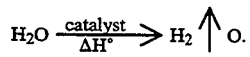

The result of the reaction is, the hydrogen drawn into the engine and consumed as fuel, and the oxygen escapes from the engine as a harmless vapor.

A reservoir or fuel tank may be used to maintain a constant supply of the liquid reactant, with a pump or other means provided for its delivery into the apparatus. The compact apparatus may be located under the hood of an automobile, for the on board generation of fuel.

DESCRIPTION OF THE PREFERRED

Figure 1:
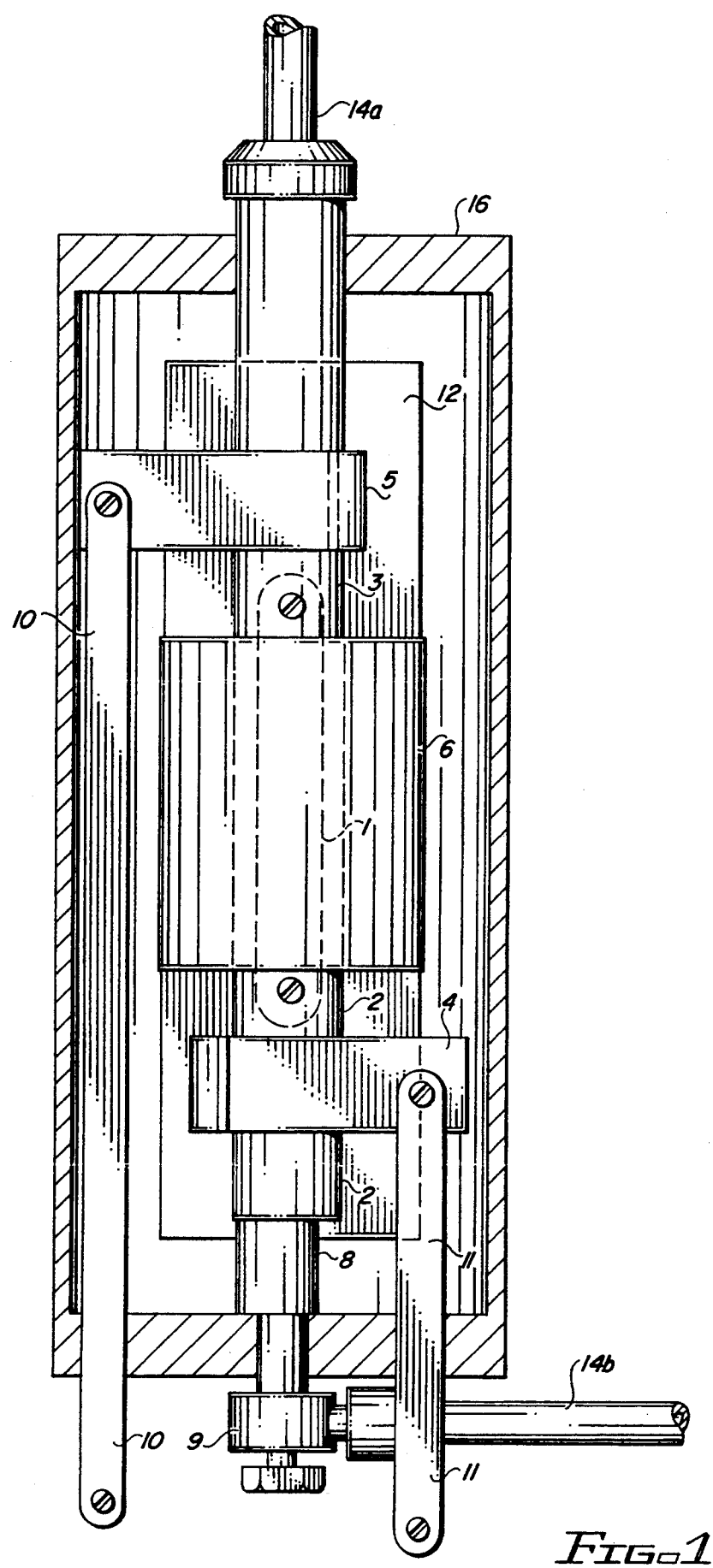
FIG. 1 is a side view, partially in section, of the present invention in completion, with all of the components indicated by number.
Figure 3:
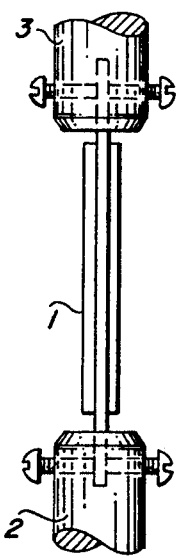
FIG. 3 is a side view of the electrode mounted in the two electrode holders.
Figure 6:
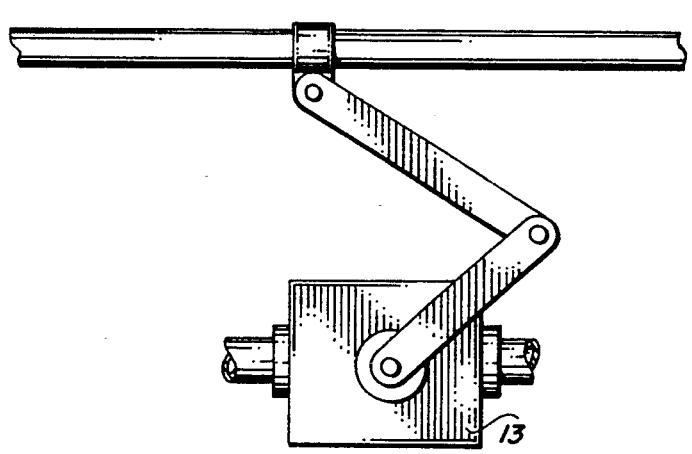
FIG. 6 is a side view of the flow regulator valve, which controls the amount of second reactant in transit through the conduit to the metering nozzle.
Figure 4:
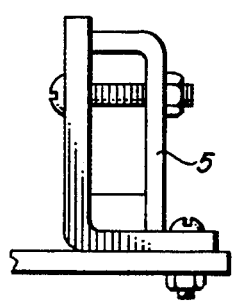
FIG. 4 is a side view of the position terminal illustrated in FIG. 3.
Figure 7:
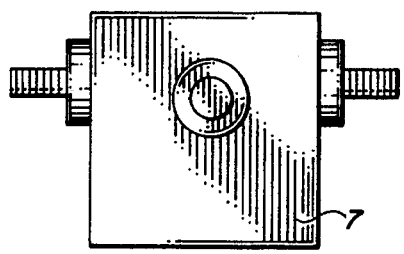
FIG. 7 is a top view of the solenoid switch, which closes the circuit energizing electrode, for the production of hydrogen.
Figure 2:
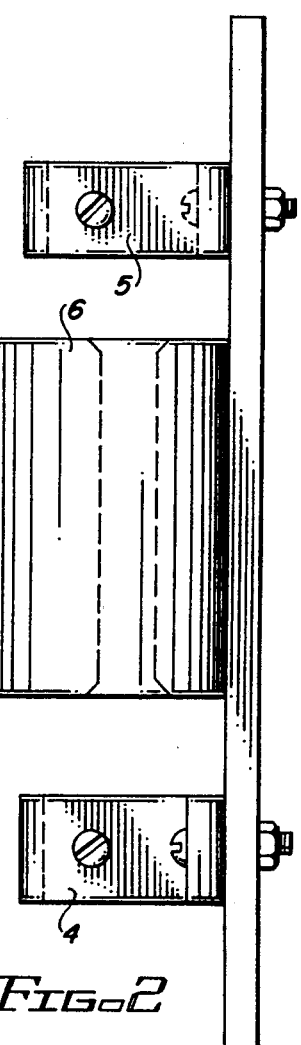
FIG. 2 is a side view of the heat-resistant supporting base, with the reactor vessel, the negative terminal and the positive terminal mounted in place.
Figure 5:
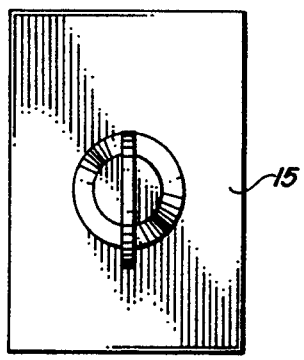
FIG. 5 is a front view of the automotive type switch, which activates the fuel pump therefor.

In reference to FIG. 1, an apparatus is shown depicting the herein described invention for the purpose of generating hydrogen gas from the reaction between the first reactant, an electrode, and the second reactant, water.

Figure 8:
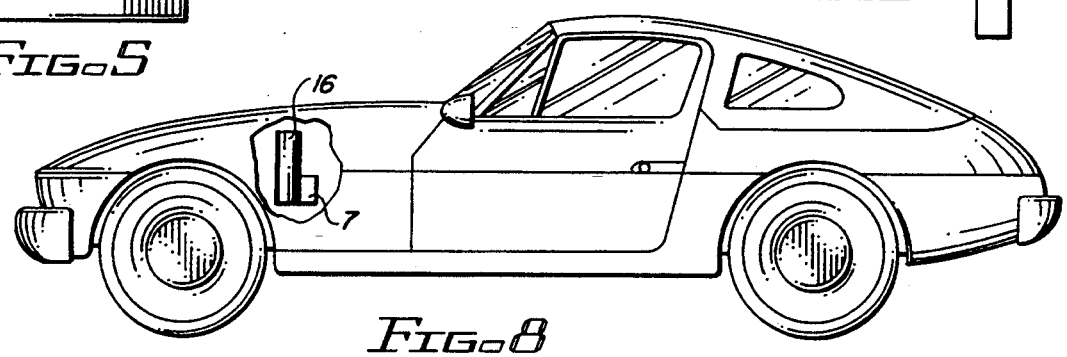
FIG. 8 is a side view of an automobile, showing the present invention installed under the hood thereof.

FIG. 8 illustrates an automobile which is fueled by hydrogen generated by the apparatus.

Referring to FIGS. 1-7 the apparatus includes a gas tight reaction vessel, (6), an electrode, (1), two hollow electrode holders, (2 and 3); a metering nozzle (8), two electrical terminals, (4 and 5), a flow regulator valve (13), a solenoid switch (7), an automotive type switch (15), two conduits, (9 and 14), a mounting plate (12) and a housing (16), together with the necessary connecting cables (10 and 11). The water supply equipment such as fuel tank and fuel pump are not shown.

Shown in FIG. 1 is an electrode (1), positioned in an aligned manner in said electrode holders (2 and 3) and extending longitudinally through the reaction vessel (6), both ends of the vessel being counterbored to accomodate the bevelled tips of the electrode holders (2 and 3) these being in close juxtaposition with the vessel (6) in order to form a gas tight seal.

One of the electrode holders (2) is in consolidation with the negative terminal (4) and the threaded end of the holder is joined with metering nozzle (8). Conduit (9) is joined to the threaded end, and the other end of the conduit is in Juncture with flow regulator valve (13). Access to the pump is provided by conduit (14) being connected, at one end, to the flow regulator valve, and at the other end, in communication with the fuel pump. Control of the flow regulator valve is accomplished by attachment and synchronization of the operating elements of the valve to the throttle linkage of the engine, in order to provide acceleration and deceleration of engine speed. The fuel pump may be mounted near the bottom of the fuel tank or reservoir, or inside the tank.

The reason for the location of the metering nozzle, and the consequent installation of the inlet for the second reactant, at the negative terminal, is this: An electrical current characteristically flows from positive to negative; therefore, with the negative terminal being energized first, the increasing water will arrive at the heated end of the electrode, and the reaction will take place one or two seconds earlier than it would were said nozzle in communication with the positive terminal. To avoid confusion, two identical conduits are numbered (14).

Electrode (1) is connected at one end into the orifice of electrode holder (2); reactor vessel (6) is positioned to encompass the electrode (1), while the vessel (6) is pressed into copulation with the tapered tip of electrode holder (2). Electrode holder (3) is placed over electrode (1), then is firmly pressed into junction with the counterbored end of reaction vessel (6), and screw or screws tightened in order to attach electrode (1) securely, thus completing a gas tight connection together with a firm electrical attachment. The externally threaded end of electrode holder (3) is to be united with conduit (14) and the gas product outlet thereof is placed in communication with the fuel inlet, or damper container, of a fuel injection the engine, or the corresponding inlet facility for engines equipped for stratified fuel, or the older type engine equipped for carburetion.

This apparatus may be easily made by any person with average skill and having access to a small lathe, a small drill press, a work bench with vise, a hack saw, ball pein hammer, tap handle, a ¼-28 tap, a ⅛ N.P.T. tap, pliers and screw driver.

The electrode may be composed of metal, non-metal or chemical compound capable of reducing water to hydrogen, or other flammable gas at certain temperatures. A combination of stainless steel and magnesium, in the form of rapidly heating thin strips, forms the most efficient electrode, as neither of these active metals is subject to, or affected by, erosion or oxidation resulting from contact with water. The reducing power of magnesium is well known, also an unlimited supply exists; magnesium metal is produced by electrolysis from magnesium chloride ($MgCL_2$), which is available in inexhaustable quantity, as it is a major component of sea water; one cubic mile of sea water contains approximately six million tone of magnesium chloride. Stainless steel conducts both heat and electrically more efficiently than does magnesium, the causing the reaction to occur more rapidly.

The electrode holders may be made of round copper bar stock, by the use of the small lathe; one end of each should be slightly bevelled, to match the corresponding counterbored end of the reactor vessel. The holder to be mounted upon the negative terminal should be bored ½ inch in diameter to a depth of 1¼ inches to receive the end of the electrode; then bore on through with a small drill, a 3/32 or a #40 drill: next, counterbore the other end of the electrode holder with a #6 drill to a depth of ½ inch and tap with a ⅛ N.P.T tap, to accomodate the metering valve. The electrode holder to be mounted upon the position terminal should be bored through with a ½ inch drill, and the gas outlet end thereof should be threaded to allow operational connection with the conduit leading to the fuel intake facility of the engine. Each holder should then be drilled and tapped to receive ¼-28 screws close to the bevelled ends; one screw on each side of each holder, to serve as electrical contact with the electrode end, and also to sectors said electrode in place.

Reactor vessel should be made of refractory brick mix, available on the market, or from the McMaster-Carr Co, in Chicago. Size is not critical, but need not be over three and one-half inches in length, and should be at least one and one-half inches shorter then the electrode. The inside diameter of the reactor vessel should be approximately one and one-half to two times the diameter or width of the electrode to be used; wall thickness thereof should be about ¾ inch to one inch. The ends of the inside diameter, or bore, should be counterbored to match the tapered ends of the electrode holders, in order to make the vessel gas tight. When modulated to satisfaction, vessel should be baked in a ceramic oven at a temperature of about 2100 F.

Positive and negative cables leading from battery to solenoid should be of comparable size to A.W.G. 1, with a nominal O. D. of 0.530″. Those leading from solenoid to apparatus should be of equivalent diameter. Said diameters permit minimal resistance to the current, allowing reactant #1 to perform with greater efficiency. The current should be furnished by a storage battery with a capacity of six to nine hundred cold cranking amperes. The electrical terminals may be made of flat copper bar stock, ⅛ inch by 1 inch, two pieces four inches in length, two pieces three inches in length, and all pieces drilled and bent as shown. The terminals are to be mounted in correct position, upon asbestos plate and protected by housing as shown.

The ignition switch of the automobile is turned to the first, or ignition position, to energize the solenoid switch (7), this heating the electrode (1). This position should be held for about five seconds, then the automotive type switch (15) should be closed to activate the fuel pump, to force water through the negative electrode holder into reaction vessel, and into contact with the heated electrode. Then the ignition should be moved to the starting position to begin operation of the engine. The sequence is as follows:

1. Turn ignition to first position, hold five seconds.
2. Energize secondary circuit by automotive switch.
3. Move ignition switch to start position.

I claim:

1. An apparatus for generating hydrogen gas from water using a source of electric power, said apparatus comprising a hollow reaction vessel; a water intake conduit positioned in fluid communication with one end of said reaction vessel and a gas outlet conduit positioned in fluid communication with the opposite end of said reaction vessel; an electrode connected to the source of electric power and extending through said reaction vessel and having a first end secured in said water intake conduit and a second end secured in said gas outlet conduit; pump means provided in fluid communication with said water intake conduit for pumping water into said water intake conduit; switch means provided in electrical communication with said electrode and the source of electric power for selectively energizing said electrode, whereby said electrode is heated responsive to operation of said switch means and electric power, and water is caused to flow through said water intake conduit into said reaction vessel and contacts said electrode and is converted into hydrogen and oxygen gas for exiting said gas outlet, responsive to operation of said pump means.

2. The apparatus of claim 1 comprising a housing enclosing said reaction vessel, said water intake conduit and said gas outlet conduit.

3. The apparatus of claim 1 comprising a first electrode holder in said water intake conduit and releasably engaging one end of said electrode, a metering nozzle positioned in said water intake conduit in fluid communication with said first electrode holder, a second electrode holder in said gas outlet conduit and releasably engaging the opposite end of said electrode and an outlet pipe positioned in fluid communication with said second electrode holder for transporting the hydrogen and oxygen gas from said reaction vessel.

4. The apparatus of claim 1 comprising a housing enclosing said reaction vessel, said water intake conduit and said gas outlet conduit and releasably engaging one end of said electrode, a metering nozzle positioned in said water intake conduit in fluid communication with said first electrode holder, a second electrode holder in said gas outlet conduit and releasably engaging the opposite end of said electrode and an outlet pipe positioned in fluid communication with said second electrode holder for transporting the hydrogen and oxygen gas from said reaction vessel.

5. The apparatus of claim 1 wherein said switch means comprises a solenoid switch.

6. The apparatus of claim 5 comprising a housing enclosing said reaction vessel, said water intake conduit and said gas outlet conduit.

7. The apparatus of claim 5 comprising a first electrode holder in said water intake conduit and releasably engaging one end of said electrode, a metering nozzle positioned in said water intake conduit in fluid communication with said first electrode holder, a second electrode holder in said gas outlet conduit and releasably engaging the opposite end of said electrode and an outlet pipe positioned in fluid communication with said second electrode holder for transporting the hydrogen and oxygen gas from said reaction vessel.

8. The apparatus of claim 5, comprising a housing enclosing said reaction vessel, said water intake conduit and said gas outlet conduit and comprising a first electrode holder in said water intake conduit and releasably engaging one end of said electrode, a metering nozzle positioned in said water intake conduit in fluid communication with said first electrode holder, a second electrode holder in said gas outlet conduit and releasably engaging the opposite end of said electrode and an outlet pipe positioned in fluid communication with said second electrode holder for transporting the hydrogen and oxygen gas from said reaction vessel.

9. An apparatus for generating hydrogen gas from water and distributing the hydrogen gas to the engine of a vehicle having a battery, comprising a hollow reaction vessel; a first electrode holder positioned in fluid communication with one end of said reaction vessel and a metering nozzle positioned in fluid communication with said first electrode holder; a second electrode holder positioned in fluid communication with the opposite end of said reaction vessel and a gas outlet pipe positioned in fluid communication with said second electrode holder and the engine of the vehicle; an electrode extending through said reaction vessel and having a first end secured in said first electrode holder and a second end secured in said second electrode holder; a mount plate secured to said first electrode holder, said reaction vessel and said second electrode holder for mounting said apparatus on the vehicle; a negative connecting cable connected to said first electrode holder and the vehicle and a positive connecting cable connected to said second electrode holder and the battery; a solenoid switch connected to said positive connecting cable for selectively energizing said electrode; and a pump connected to said metering nozzle for pumping water through said metering nozzle and into said reaction vessel, whereby said electrode is heated responsive to manipulation of said solenoid switch and water is pumped through said metering nozzle and said first electrode holder into said reaction vessel and contacts said electrode and is converted into hydrogen and oxygen gas and said hydrogen and oxygen gas is distributed through said second electrode holder and said gas outlet pipe and to the engine of the vehicle, responsive to operation of said pump.

10. The apparatus of claim 9 comprising a housing enclosing said metering nozzle, said first electrode holder, said reaction vessel, said second electrode holder and said gas outlet pipe.

* * * * *